J. F. ALLEN,

Assignor to G. T. HOPE & C. T. PORTER.

Balanced Valves.

No. 9,303. Reissued July 20, 1880.

WITNESSES.

J. Walter Douglass.

Geo. T. Lindlay

INVENTOR.

John F. Allen by Henry Baldwin Jr.

Atty.

N. PETERS, PHOTO-LITHOGRAPHER, WASHINGTON, D. C.

UNITED STATES PATENT OFFICE.

JOHN F. ALLEN, OF BROOKLYN, ASSIGNOR TO GEORGE T. HOPE, OF BAY RIDGE, N. Y., AND CHARLES T. PORTER, OF PHILADELPHIA, PA.

BALANCED VALVE.

SPECIFICATION forming part of Reissued Letters Patent No. 9,303, dated July 20, 1880.

Original No. 167,865, dated September 21, 1875. Application for reissue filed June 2, 1880.

*To all whom it may concern:*

Be it known that I, JOHN F. ALLEN, formerly of the city, county, and State of New York, but now of Brooklyn, New York, have invented certain new and useful Improvements in Balanced Slide-Valves, of which improvements the following is a specification.

My invention relates to that class of balanced slide-valves in which the valve is practically relieved from the pressure of the steam, this pressure being sustained by a plate supported above the valve, but so nearly in contact with it that the space between them will not admit steam enough to affect the valve. Such plates are designated as "pressure" plates, and have been made in some instances adjustable, in order that they may be closed up to the valve as the faces of the valve and its seat become worn. Heretofore such adjustments have been effected by different mechanical devices, among which there was, in one instance, a spring to move the plate laterally or crosswise of the valve while the pressure of the steam held the plate down; and in other instances screws were used to move the plate in two directions, both in line with the movement of the valve, and to hold the plate in its adjusted position. All of these devices, however, are liable to objections well understood by engineers.

It is the object of my invention to obviate these objections in a balanced slide-valve; and to this end my improvements consist in utilizing the pressure of the steam for giving motion to the pressure-plate down inclined supports and toward the valve; in employing supports inclined to the face of the valve at a steep angle, considerably exceeding the angle of repose of the metal, so that the pressure of the steam on the upper surface of the pressure-plate may be relied on for giving to it the above-described motion, and in employing an adjustable stop to prevent the pressure of the steam from forcing the pressure-plate into too close contact with the valve.

Figure 1:
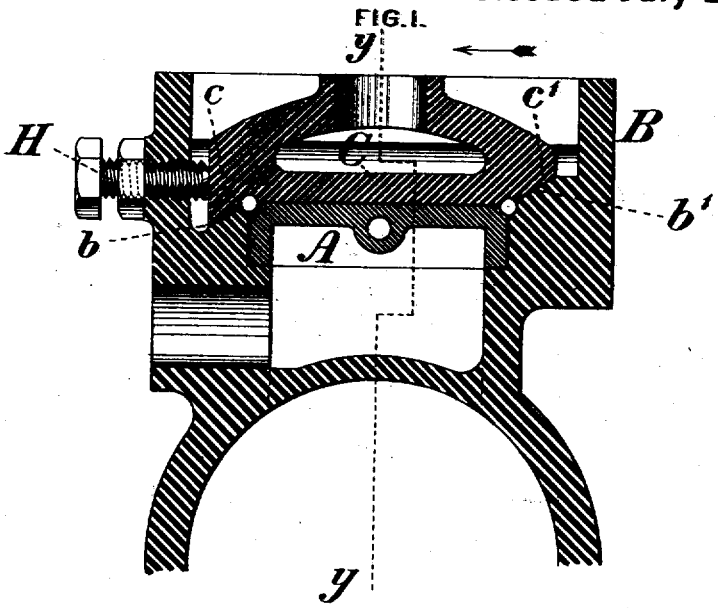
Figure 2:
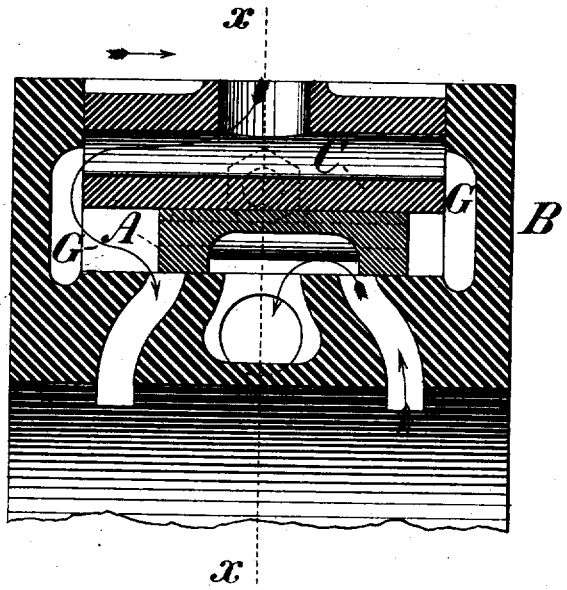

In the accompanying drawings, which form part of this specification, Figure 1 is a transverse section through a steam-chest in which my improved balanced slide-valve is applied, the section being on the line *x x* of Fig. 2, and Fig. 2 is a longitudinal section on the line *y y* of Fig. 1.

The valve A is fitted upon its seat in the steam-chest B, and moved to and fro over the ports in the usual manner. The back of the valve is a plane surface, parallel with its face. Along the sides of the steam-chest I provide two parallel guides—one, *b*, inclined downward and outward, and the other, *b'*, inclined upward and outward, as shown in Fig. 1, from a point in the same plane with the back of the valve and at an angle considerably greater than the angle of repose of the metal. Theoretically, the plate should move down its inclined supports if the angle of inclination exceeds at all the angle of repose; but, practically, under conditions, often unfavorable, existing in the steam-chest to render the action certain, this angle should be largely in excess, as shown in the model and drawings. In the instance shown I have provided chambers G at the ends of the steam-chest, through which the steam may pass over the ends of the pressure-plate to the ports; but any other approved passage for the steam may be provided.

The pressure-plate C fits snugly in the steam-chest lengthwise, and moves freely in it crosswise. This plate has an opening in the top and a hollow center, so that the steam entering at the top passes through the center and into the chambers G, at the ends of the steam-chest. The bottom of this plate has a plane surface, parallel with the back of the valve A, and beyond this plane surface it has lateral inclines *c c'*, parallel with the lateral inclines *b b'* on the sides of the steam-chest, so that when the plate is in place its lateral inclines rest upon and fit closely to the inclines on the chest, thus supporting the plane surface of the bottom of the plate close to the top of the valve.

The width of the plate being less than that of the chest B, it will be seen that the plate in this position would have a certain range of movement upon the inclines crosswise of the steam-chest.

A screw-stop, H, passes through the steam-chest, and bears upon the adjacent side of the pressure-plate, which will still be free to be moved crosswise of the valve.

The operation is as follows: The stop H being adjusted to the point at which it is desired to maintain the pressure-plate, the pressure of the steam will act upon the plate and tend to force it down the inclines *b b'* crosswise of the valve and against the stop, which will thus determine the range of movement of the plate and the relation between its plane surface and the back of the valve. At the same time the stop, being entirely independent of or disconnected from the plate, can be readjusted as required to compensate for any wear upon the surfaces of the valve or its seat, and the steam will at all times maintain the plate at the point determined by the adjustment of the stop. This adjustment is, of course, made without opening the steam-chest.

I do not claim the employment of inclined supports by a movement along which the pressure-plate is caused to approach or to recede from the valve, since this device has been already the subject of patent; but

I claim as my own invention and desire to secure by Letters Patent—

1. A balance-valve provided with a pressure-plate acted upon by steam-pressure and having a downward and lateral movement through means of steep inclines, as shown, as and for the purpose set forth.

2. A balance-valve provided with a pressure-plate reposing upon steep inclines, as shown, and suitable means for limiting its movement upon the inclines, the said plate being held down by steam-pressure, as and for the purpose set forth.

JOHN F. ALLEN.

Witnesses:
DE WITT BOGARDUS,
J. W. DURBROW.